Nov. 11, 1930.                H. L. BROWNBACK                1,781,434
                                INLET MANIFOLD
                              Filed July 17, 1928
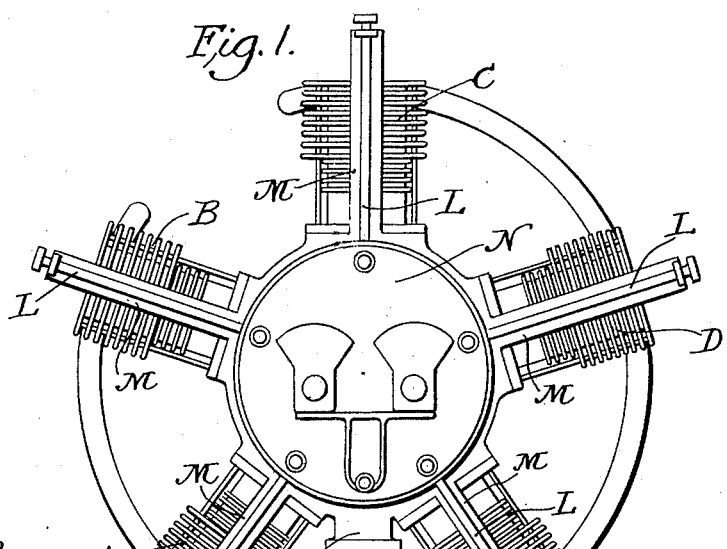
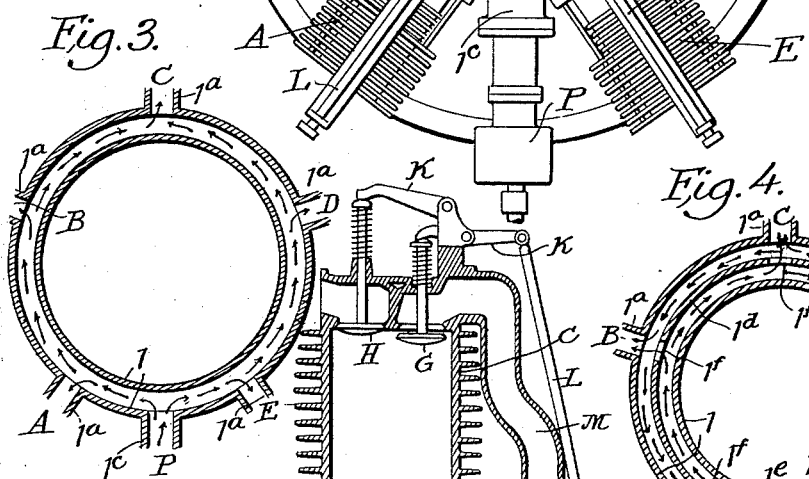
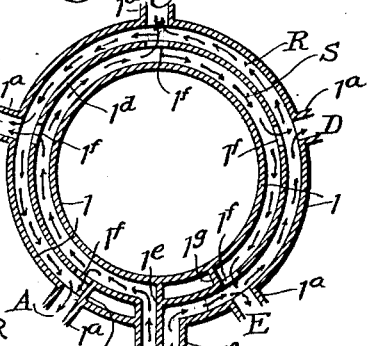
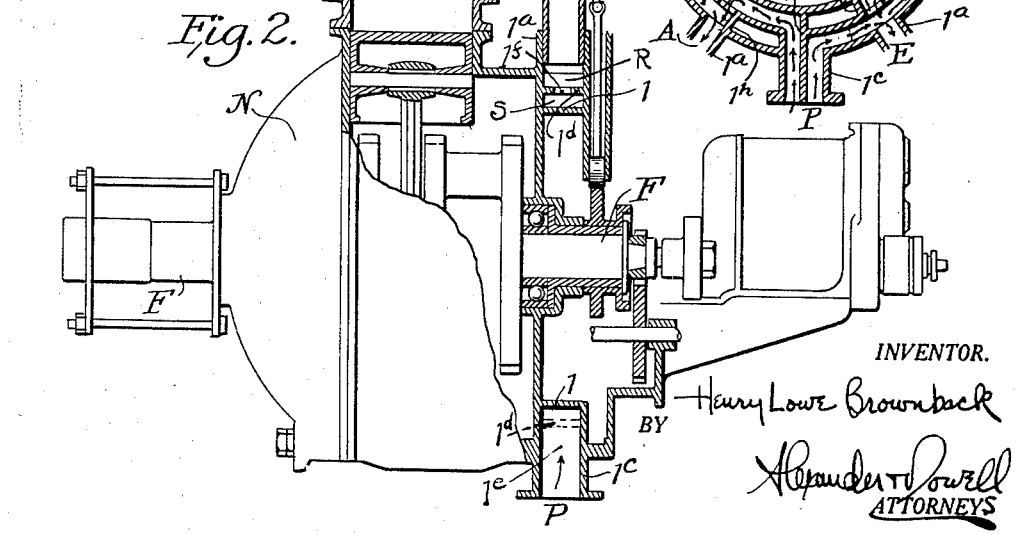
INVENTOR.
Henry Lowe Brownback
BY
Alexander Powell
ATTORNEYS Patented Nov. 11, 1930

1,781,434

UNITED STATES PATENT OFFICE

HENRY LOWE BROWNBACK, OF NORRISTOWN, PENNSYLVANIA

INLET MANIFOLD

Application filed July 17, 1928. Serial No. 293,454.

This invention is an improvement in inlet manifolds particularly designed for multiple cylinder internal combustion engines having the cylinders arranged radially about the crankshaft; and the principal object of the invention is to provide a simple, novel and efficient annular inlet manifold which will distribute the fuel vapors or gases evenly to all the cylinders; and furthermore will provide the same volume of fuel vapors or gases at the same velocity to each cylinder, the vapors or gases traveling through the same length of passage through the manifold and intake pipes from the carburetor to each cylinder.

The difficulty of providing an evenly distributed mixture of fuel vapors to this type of internal combustion engine with the cylinders arranged radially about the axis of the crankshaft, has long been recognized, and the conditions which exist have been accepted as inevitable although attempts have been made to obviate this difficulty by the use of more or less complicated means such as providing separate manifolds feeding a certain number of cylinders, the usual number of separate manifolds used on a nine cylinder engine being three; also rotary elements or the like in the manifolds have been used in the manifold to counteract this difficulty.

I will explain the invention with reference to the accompanying drawing which illustrates one practical embodiment thereof to enable others familiar with the art to adopt and use the same; and will summarize in the claims the novel features of construction, and novel combinations of parts, for which protection is desired.

In said drawings:—

Figure 1 is an elevation showing diagrammatically a 5-cylinder radial type internal combustion engine to which my novel inlet manifold is applied.

Figure 2 is an enlarged transverse section through one of the cylinders and inlet manifold.

Figure 3 is a section through an ordinary inlet manifold for a 5-cylinder radial engine.

Figure 4 is a similar section through my novel inlet manifold designed for a 5-cylinder radial engine.

As shown in Figs. 1 and 2, the invention is illustrated in connection with a 5-cylinder radial type internal combustion engine, the five cylinders being indicated by the letters A, B, C, D, and E, and the cylinders being all evenly spaced around the crankshaft F. G (Fig. 2) represents the inlet valve, and H the outlet valve, the valve being actuated by rocker arms K and push rods L. The intake pipes for each cylinder are indicated by the letter M.

Formed integrally with or attached to one end of the crank case N, co-axial with the crank shaft F, is an annular inlet manifold 1 (Fig. 2) having 5 evenly spaced outlets $1^a$ opposite each of the cylinders A to E inclusive; which outlets are connected respectively with pipes M leading to the respective inlet valve G of the cylinders as shown in Fig. 2. The pipes M for all the cylinders A, B, C, D and E are similarly connected to their respective inlet ports as shown in Fig. 2 and all the pipes M are of the same length.

At the bottom of the annular inlet manifold 1, preferably disposed midway, between the outlets $1^a$ for cylinders A and E is a carburetor header $1^c$ for attachment thereto of a carburetor P for supplying fuel vapors to each of the cylinders.

Referring to Fig. 3 which shows the usual annular inlet manifold, detached, the fuel vapors from carburetor P enter the annular manifold through header $1^c$ and divide as shown by the arrows, passing upwardly at each side of the manifold towards the upper outlet $1^a$ for cylinder C. In this construction obviously there can be no even distribution of the fuel vapor or gas mixture primarily for the reason that the distances from header $1^c$ to outlets $1^a$ for the different cylinders A and E is shorter than the distance to cylinders B and D; and cylinder C would receive the lightest vapors which must travel the longest path, and the solution of the difficulty in obtaining an evenly distributed fuel mixture lies in providing the same volume of gas to each cylinder at the same velocity and passing through the same length of passage in the manifold 1 from the carburetor P.

Even if two inlets were provided from carburetor P, one entering the manifold 1 midway between cylinders A and B and the other inlet 1$^c$ entering manifold 1 midway between cylinders D and E, the results would be worse, as the heavy ingredients of the fuel mixture would "puddle" at the bottom of the manifold 1 and thereby give cylinders A and E an over-rich mixture; furthermore the distances to each cylinder would vary enormously also.

My solution to the problem is clearly illustrated in Fig. 4, in which the manifold 1 is formed as two concentric annular rings by providing an annular wall 1$^d$ within the manifold equally dividing the cross-sectional area of the manifold 1 into two separate annular compartments or ducts R and S. The header 1$^c$ is likewise divided by a wall 1$^e$, one side of the wall 1$^e$ in header 1$^c$ communicating only with the inner duct S, and the other side of 1$^e$ communicating with only the outer duct R. In the annular wall 1$^d$, opposite each of the outlet ports 1$^a$ is an opening 1$^f$ whereby the fuel gas from the inner duct S may pass directly through the outer duct R and into the outlet port 1$^a$ and hence to its respective cylinder.

Header 1$^c$ in Fig. 4 is also disposed at the lower end of the manifold 1, and header 1$^c$ may be connected in any well known manner either to a single carburetor P, or to a carburetor having a double mixing chamber, or to two separate carburetors the same forming no part of the present invention. The fuel gases from the carburetor P divide at the wall 1$^d$ and pass upwardly through their respective ducts R and S towards the end of the said ducts, the gases in duct S traveling in the opposite direction from those in duct R as indicated by the arrows in Fig. 4. A fillet 1$^g$ at the end of duct S directs the fuel gases out through hole 1$^f$ into cylinder E and closes the end of said duct S. Similarly a fillet 1$^h$ closes the outer duct R directing the gases therefrom through hole 1$^f$ into cylinder A.

By reason of the holes 1$^f$ in annular wall 1$^d$, and the opposite directions of travel of each half of the fuel gases in ducts R and S the total distance traveled by the total fuel vapors for each cylinder from the carburetor P is the same for each cylinder, since half the fuel gases must travel in one direction which may be a short route through duct R as in the case of cylinder E and the other half for cylinder E must travel in the opposite direction by way of the long route through duct S.

With the engine shown in Fig. 1 the five cylinder radial motor rising might have two firing orders, viz A—C—E—B—D; or A—D—B—E—C.

I do not limit my invention to the exact form shown in the drawing for obviously changes may be made therein within the scope of the claims; and moreover my novel manifold may be used on any multiple cylinder radial type engine.

I claim:—

1. In a multiple cylinder internal combustion engine, an intake manifold having a plurality of fuel ducts extending from the carbureter to the inlet of each cylinder whereby each cylinder is supplied with a like volume of fuel vapors at any engine speed.

2. In an engine as set forth in claim 1, said manifold having adjacent ducts each receiving half of the fuel vapors and conducting same in opposite directions.

3. In a multiple cylinder internal combustion engine, an intake manifold having a plurality of ducts each extending from the carbureter to the inlet of each cylinder and whereby each cylinder is supplied with a like volume of fuel vapors at approximately the same velocity and through approximately the same length of ducts at any engine speed.

4. In an engine as set forth in claim 3, said manifold being circular and having two adjacent ducts each receiving half the fuel vapors and conducting same in opposite directions.

5. In a multiple cylinder internal combustion engine, an intake manifold having ducts extending from the carbureter to the inlet of each cylinder adapted to feed to each cylinder the same volume of fuel vapors at the same velocity through the same length of manifold ducts at any engine speed; and means for feeding fuel vapors to the manifold.

6. In an engine as set forth in claim 5, said manifold being annular and having two adjacent ducts each receiving half the fuel vapors and conducting same in opposite directions, and delivering same to the inlet port of each cylinder.

7. In a multiple cylinder radial type internal combustion engine; an intake manifold, feed pipes of equal length leading from the manifold to each cylinder; said manifold having ducts feeding to each cylinder the same volume of fuel vapors at the same velocity through the same length of manifold ducts at any engine speed; and means for feding fuel vapors to the manifold.

8. In an engine as set forth in claim 7, said manifold being annular and having two adjacent ducts each receiving half the fuel vapors and conducting same in opposite directions around the manifold.

9. An intake manifold for multiple cylinder internal combustion engines comprising a circular body having two adjacent ducts adapted to conduct fuel vapors in opposite directions; means for introducing half the fuel vapors into each duct; and an inlet port for each cylinder tapping both ducts.

10. An intake manifold for radial type multiple cylinder internal combustion engines comprising an annular body having two adjacent ducts adapted to conduct fuel vapors in opposite directions; means for introducing half the fuel vapors into each duct at the same point; and an inlet port for each cylinder tapping both ducts.

11. An intake manifold for multiple cylinder internal combustion engines, comprising an annular body having a carburetor header; a partition in the header for dividing the fuel gases; an annular division wall in the annular body dividing same into two adjacent ducts, one duct communicating with the header at one side of the partition and the other duct communicating with the header at the other side of the partition; and an inlet port for each cylinder communicating with both ducts.

12. An intake manifold for multiple cylinder internal combustion engines, comprising an annular body having a carburetor header; a partition wall in the header for dividing the fuel gases; an annular division wall in the manifold dividing same into adjacent inner and outer ducts, one duct communicating with the header at one side of the partition and the other duct communicating with the header at the other side of the partition; and an inlet port for each cylinder communicating directly with the outer duct and also with the inner duct through an opening in the annular division wall opposite such inlet port.

HENRY LOWE BROWNBACK.